United States Patent
Kumano

(10) Patent No.: US 9,858,281 B2
(45) Date of Patent: Jan. 2, 2018

(54) INFORMATION PROCESSING SYSTEM, RECORDING MEDIUM, AND INDEX MANAGEMENT METHOD

(71) Applicant: FUJITSU LIMITED, Kawasaki-shi, Kanagawa (JP)

(72) Inventor: Tatsuo Kumano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 276 days.

(21) Appl. No.: 14/519,322

(22) Filed: Oct. 21, 2014

(65) Prior Publication Data

US 2015/0120752 A1 Apr. 30, 2015

(30) Foreign Application Priority Data

Oct. 30, 2013 (JP) .................................. 2013-225881

(51) Int. Cl.
*G06F 17/30* (2006.01)

(52) U.S. Cl.
CPC ...... *G06F 17/30094* (2013.01); *G06F 17/301* (2013.01)

(58) Field of Classification Search
CPC .............. G06F 17/30094; G06F 17/301; G06F 17/30348; G06F 17/30445; G06F 17/30619; G06F 17/30702; G06F 17/30997
See application file for complete search history.

(56) References Cited

U.S. PATENT DOCUMENTS

| | | | |
|---|---|---|---|
| 4,817,050 A | 3/1989 | Komatsu et al. | |
| 6,101,491 A * | 8/2000 | Woods | G06F 17/30011 707/696 |
| 7,991,756 B2 * | 8/2011 | Jacopi | G06F 17/30613 707/706 |
| 8,402,052 B2 * | 3/2013 | Sano | G06F 17/30333 706/10 |
| 8,738,610 B2 * | 5/2014 | Anderson | G06F 17/30495 707/722 |

(Continued)

FOREIGN PATENT DOCUMENTS

| | | |
|---|---|---|
| JP | 62-121576 | 6/1987 |
| JP | 2002-7641 | 1/2002 |

(Continued)

*Primary Examiner* — Debbie Le
(74) *Attorney, Agent, or Firm* — Staas & Halsey LLP

(57) ABSTRACT

An information processing system including: a plurality of second information processing apparatuses connected to a first information processing apparatus via a network; and a management apparatus. The plurality of second information processing apparatuses dispersedly manage indexes established for searches using data and metadata of the data. The management apparatus includes a processor configured to monitor a search request transmitted from the first information processing apparatus, and to specify, on the basis of a monitoring result by the processor, a combination of types of the metadata, for which the processor should cause a same second information processing apparatus to manage the indexes, and the same second information processing apparatus and cause the specified same second information processing apparatus to manage the indexes of the type of the metadata of the specified combination.

10 Claims, 12 Drawing Sheets

(56) References Cited

U.S. PATENT DOCUMENTS

| | | | | |
|---|---|---|---|---|
| 2006/0069883 A1* | 3/2006 | Shimizu | G06F 17/30587 | 711/154 |
| 2008/0097821 A1* | 4/2008 | Chickering | G06Q 30/0201 | 705/7.29 |
| 2009/0070314 A1* | 3/2009 | Duncan | G06F 17/30864 | |
| 2010/0235390 A1* | 9/2010 | Sano | G06F 17/30333 | 707/770 |
| 2011/0106828 A1* | 5/2011 | Mauge | G06F 17/2795 | 707/765 |
| 2012/0089628 A1* | 4/2012 | Iguchi | G06F 17/30864 | 707/759 |
| 2012/0254215 A1* | 10/2012 | Miyata | G06F 17/30194 | 707/758 |
| 2012/0310874 A1* | 12/2012 | Dantressangle | G06F 17/30321 | 707/600 |
| 2014/0012884 A1* | 1/2014 | Bornea | G06F 17/30958 | 707/798 |
| 2014/0067001 A1* | 3/2014 | Schwibner | A61N 1/3968 | 607/7 |
| 2014/0201187 A1* | 7/2014 | Larson | G06F 17/30398 | 707/711 |
| 2014/0317040 A1* | 10/2014 | Liu | G06K 9/6296 | 706/46 |
| 2015/0213043 A1* | 7/2015 | Ishii | G06F 17/30917 | 707/741 |

FOREIGN PATENT DOCUMENTS

| | | |
|---|---|---|
| JP | 2012-48592 | 3/2012 |
| JP | 2012-168781 | 9/2012 |

* cited by examiner

|  | METADATA 1 | METADATA 2 | ... |
|---|---|---|---|
| METADATA 1 | NUMBER OF TIMES METADATA 1 IS SEARCHED | NUMBER OF TIMES METADATA 1 AND METADATA 2 ARE SIMULTANEOUSLY SEARCHED | ... |
| METADATA 2 | UNUSED | NUMBER OF TIMES METADATA 2 IS SEARCHED | ⋱ |
| ⋮ | ⋮ | ⋱ | ⋱ |

SEARCH CONDITION : NAME = TANAKA AND AGE = 20

|      | NAME | AGE |
|------|------|-----|
| NAME | 1    | 1   |
| AGE  | –    | 1   |

FIG. 3B

SEARCH CONDITION : NAME = YAMADA

|      | NAME | AGE |
|------|------|-----|
| NAME | 2    | 1   |
| AGE  | –    | 1   |

FIG. 3C

SEARCH CONDITION : NAME = UEDA AND AGE < 30

|      | NAME | AGE |
|------|------|-----|
| NAME | 3    | 2   |
| AGE  | –    | 2   |

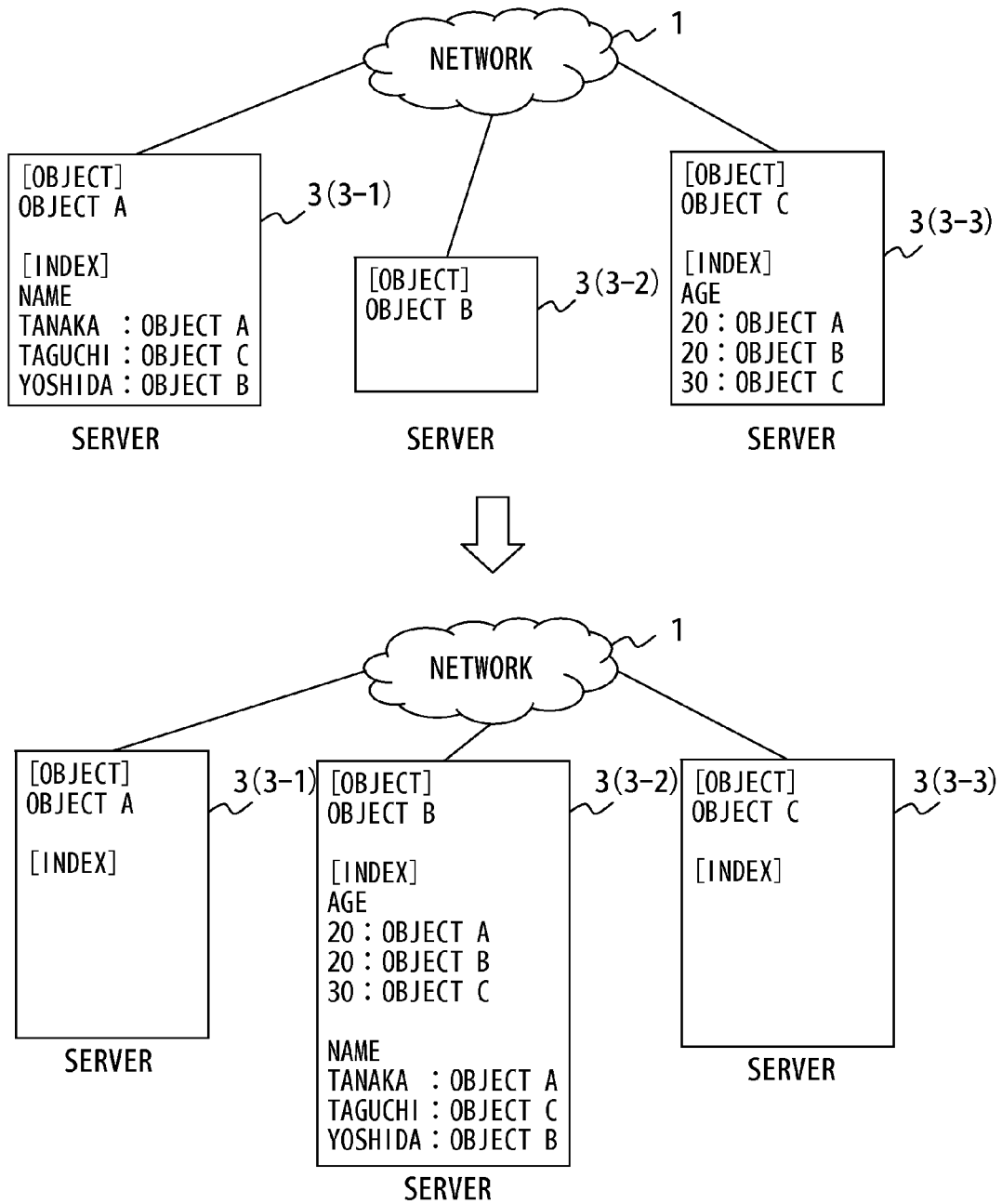
F I G. 4

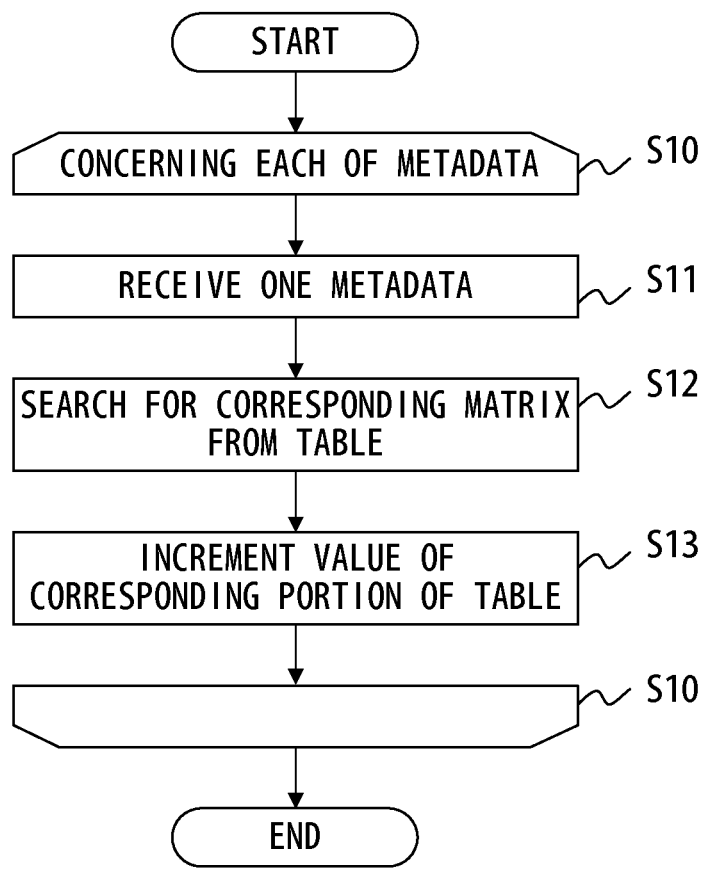
F I G. 6

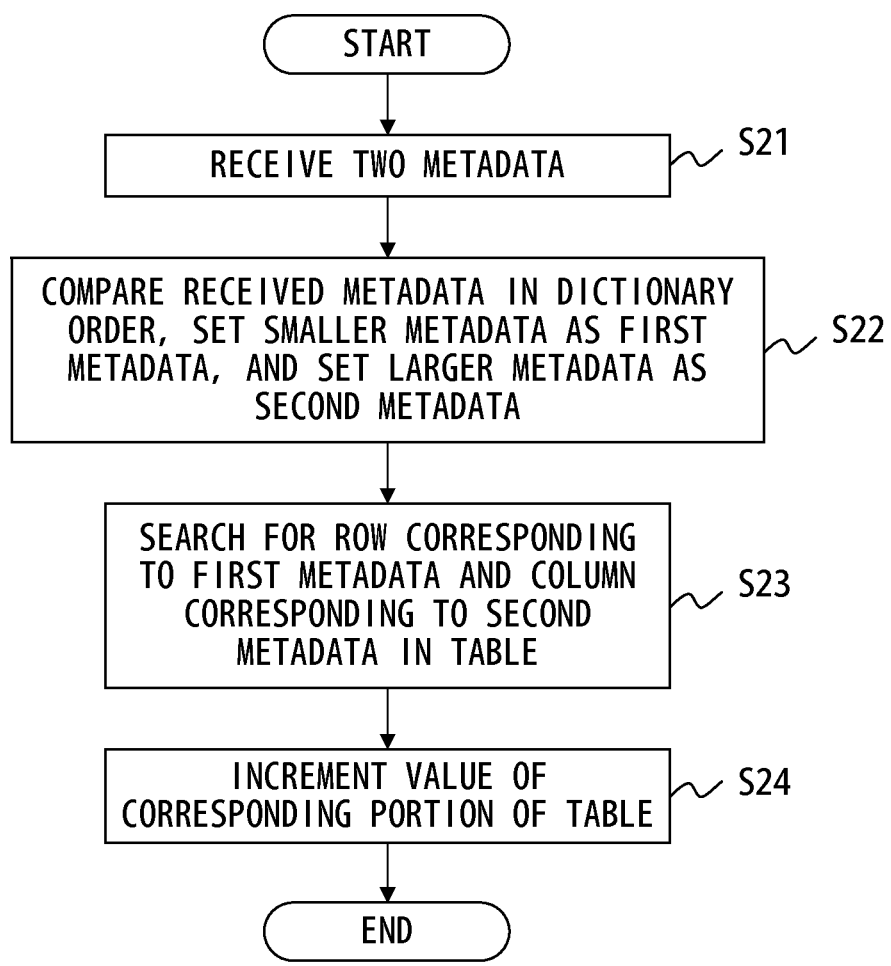
F I G. 7

| SERVER NAME | COVERAGE |
|---|---|
| SERVER 1 | RANGE OF HASH VALUE COVERED BY SERVER 1 |
| SERVER 2 | RANGE OF HASH VALUE COVERED BY SERVER 2 |
| ⋮ | ⋮ |

F I G. 1 1

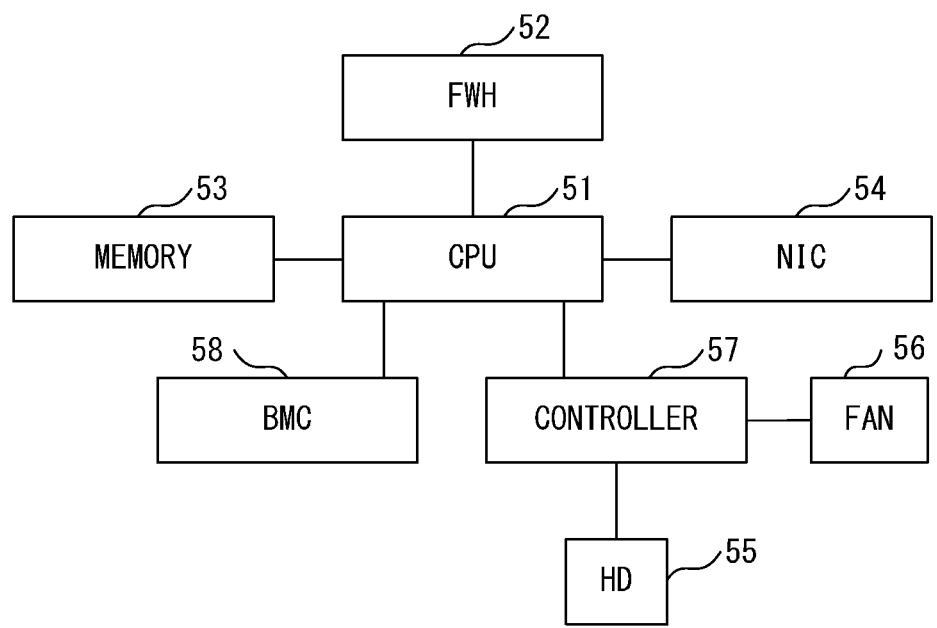
F I G. 12

INFORMATION PROCESSING SYSTEM, RECORDING MEDIUM, AND INDEX MANAGEMENT METHOD

CROSS-REFERENCE TO RELATED APPLICATION

This application is based upon and claims the benefit of priority of the prior Japanese Patent Application No. 2013-225881, filed on Oct. 30, 2013, the entire contents of which are incorporated herein by reference.

FIELD

The embodiments relates to a technique for distributing indexes established for searches using data and metadata of the data to a plurality of information processing apparatuses and managing the indexes.

BACKGROUND

A data amount accumulated in an information processing apparatus such as a computer tends to increase. Therefore, at present, it is strongly demanded to manage a large amount of data at lower costs. A distributed object storage attracts attention as one of techniques capable of managing a large amount of data at low costs.

The distributed object storage is established as an information processing system in which a plurality of servers are used. In the distributed object storage, data is managed as objects. The objects are dispersedly stored in servers that configure the distributed object storage. By distributing the objects, both of resource amounts usable for the storage and calculation (processing) of the objects are improved according to the number of the servers. Therefore, in the distributed object storage, it is possible to improve both of a storage capacity and performance by adding servers.

It is also possible to distribute a load of processing by distributing the objects. Therefore, performance required of the servers is reduced. Therefore, in the distributed object storage, it is possible to reduce costs required for scale-out for increasing the number of the servers.

In the distributed object storage, metadata is used for management of the objects. The metadata is information related to the objects corresponding thereto and is used for searches and extractions of the corresponding objects. Therefore, indexes, which are data for searching and extracting the objects, are established using the metadata. One or more metadata are created for one object.

The searches in the distributed object storage are performed by servers that manage the indexes. Systems described below are used for the management of the indexes in the distributed object storage.
(a) Specific dedicated servers (e.g., one server) centrally manage all the indexes (hereinafter referred to as "centralized management system")
(b) A different server manages each of the indexes (hereinafter referred to as "individual management system")
(c) The servers manage the indexes of the objects stored in the servers (hereinafter referred to as "parallel management system")

The management systems respectively have problems explained below.

In the centralized management system, searches and update of the indexes concentrate in the dedicated server. Usually, the number of the dedicated servers that manage the indexes is extremely small compared with the number of the servers that manage the objects. Therefore, a load on the dedicated servers tends to be heavy. The heavy load deteriorates search performance.

The distributed object storage usually supports an AND search that designates a plurality of metadata. In the individual management system, in the case of the AND search, for each of the designated metadata, an inquiry has to be transmitted to the server that manages the index corresponding to the metadata. A front end or the like has to perform processing for acquiring, from the servers, target objects specified by inquiries and extracting, out of the acquired target objects, target objects that satisfy search conditions designated by the AND search. Therefore, in the individual management system, a transfer amount of data tends to be large and it is difficult to obtain high search performance.

In the parallel management system, as in the individual management system, in the case of the AND search, for each of the designated metadata, an inquiry has to be transmitted to the server that manages the index corresponding to the metadata. Therefore, it is difficult to obtain high search performance.

As explained above, all the management systems have a problem in that the search performance tends to be deteriorated during the AND search. If convenience for users who need the objects are taken into account, it is considered important to suppress the deterioration in the search performance during the AND search.

Patent Literature 1: Japanese Patent Application Laid-Open No. 2012-168781.
Patent Literature 2: Japanese Patent Application Laid-Open No. S62-121576
Patent Literature 3: Japanese Patent Application Laid-Open No. 2002-7641
Patent Literature 4: Japanese Patent Application Laid-Open No. 2012-48592

SUMMARY

According to an aspects of the embodiments, an information processing system includes a plurality of second information processing apparatuses connected to a first information processing apparatus via a network, and a management apparatus. The plurality of second information processing apparatuses dispersedly manage indexes established for searches using data and metadata of the data. The management apparatus includes a processor configured to monitor a search request transmitted from the first information processing apparatus, and to specify, on the basis of a monitoring result by the processor, a combination of types of the metadata, for which the processor should cause a same second information processing apparatus to manage the indexes, and the same second information processing apparatus and cause the specified same second information processing apparatus to manage the indexes of the type of the metadata of the specified combination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram for explaining a configuration example of statistical information.

FIGS. 3A to 3C are a diagram for explaining an update example of the statistical information.

FIG. 4 is a diagram for explaining a change example of a storage server and index management server caused to manage indexes.

FIG. 6 is a flowchart of first counting processing.

FIG. 7 is a flowchart of second counting processing.

FIG. 11 is a diagram for explaining a configuration example of a server list table.

FIG. 12 is a diagram showing a configuration example of an information processing apparatus usable as a storage server and index management server according to the embodiment.

DESCRIPTION OF EMBODIMENTS

An embodiment is explained in detail below with reference to the drawings. In the embodiment, it is possible to suppress deterioration in search performance during an AND search in an information processing system established using a plurality of information processing apparatuses (servers) such as a distributed object storage.

Figure 1:
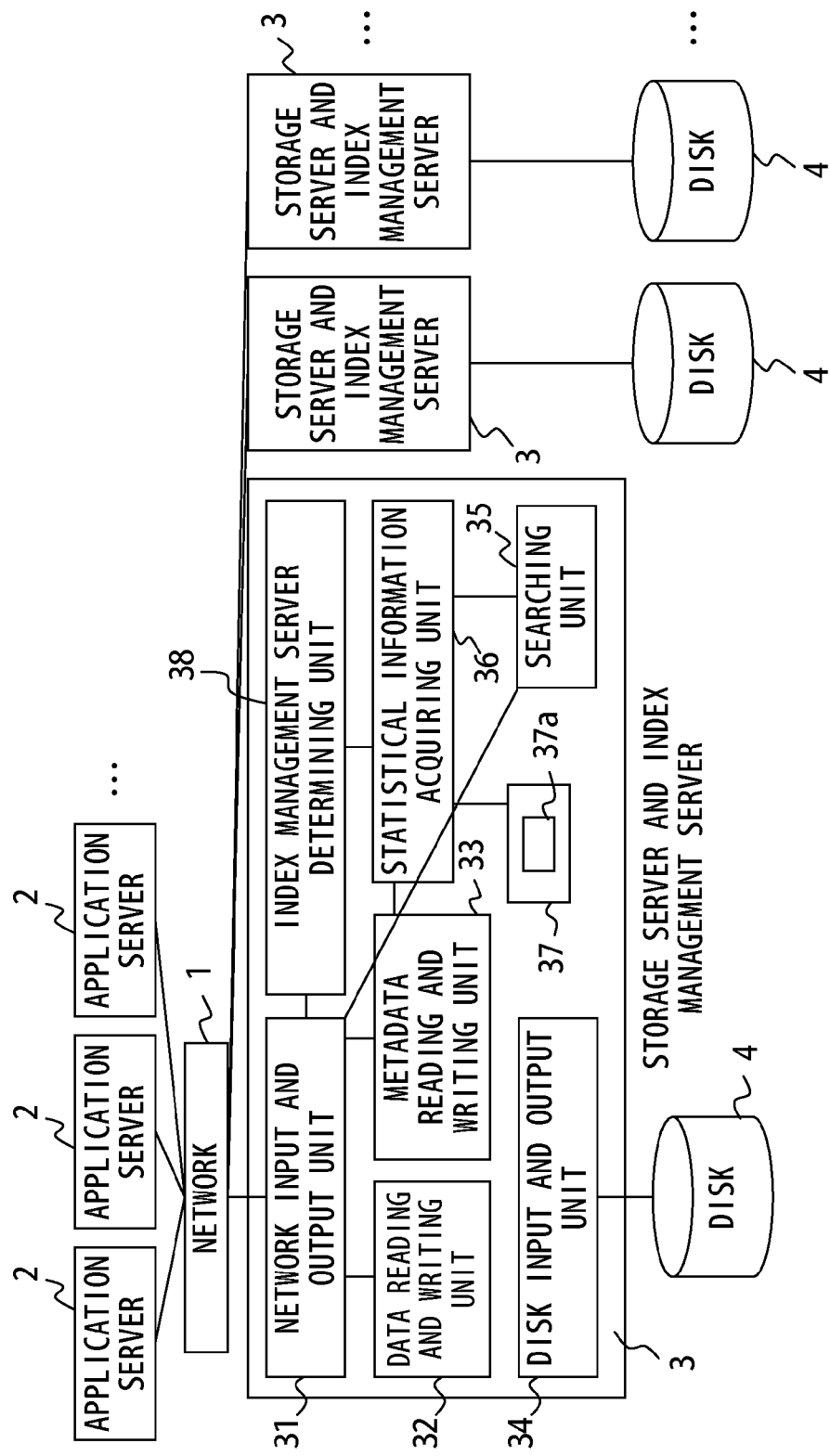
FIG. 1 is a diagram for explaining a configuration example of an information processing system established using a management apparatus according to an embodiment.

FIG. 1 is a diagram for explaining a configuration example of an information processing system established using a management apparatus according to this embodiment.

As shown in FIG. 1, the information processing system has a configuration in which a plurality of application servers 2 and a plurality of storage server and index management servers (hereinafter referred to as "storage/index management servers") 3 are connected to a network 1.

A disk device 4 that can store management target data and indexes, which are data for searches of the data, is connected to each of the storage/index management servers 3. All the storage/index management servers 3 that manage the disk device 4 are connected to the network 1, whereby a distributed object storage is established.

Usually, a plurality of disk devices 4 are connected to each of the storage/index management servers 3 or the disk device 4 is one storage. For convenience of explanation, it is assumed that one disk device 4 is connected to each of the storage/index management servers 3.

Each of the application servers 2 is a server that provides a service to a user who uses a terminal apparatus connected to not-shown another network. Each of the application servers 2 functions as a front end that provides data requested by the user of the terminal apparatus among data (objects) managed by the distributed object storage. Each of the application servers 2 can also be used for maintenance of the distributed object storage, addition and deletion of objects, registration and deletion of metadata, and the like.

Each of the storage/index management servers 3 includes, as shown in FIG. 1, as functional components, a network input and output unit 31, a data reading and writing unit 32, a metadata reading and writing unit 33, a disk input and output unit 34, a searching unit 35, a statistical information acquiring unit 36, a storing unit 37, and an index management server determining unit 38.

The network input and output unit 31 realizes communication performed via the network 1. Communication with the other storage/index management server 3 and each of the application servers 2 is performed using the network input and output unit 31.

The data reading and writing unit 32 is a function for operation such as readout of objects from the disk device 4, writing of objects in the disk device 4, and deletion of objects stored in the disk device 4. Actual operation is performed by the disk input-output unit 34.

The metadata reading and writing unit 33 is a function for operation such as readout of metadata from the disk device 4, writing of metadata in the disk device 4, and deletion of metadata stored in the disk device 4. In the disk device 4, the metadata is stored as apart of data that configures an index. Therefore, actual operation is performed as operation for update of the index performed using the disk input and output unit 34.

The index is data for searches established for each type of metadata using the metadata. The index includes, for each value (content) of the metadata, storage destination information representing a storage destination of an object to which the value is allocated as metadata. The index can specify, from the storage destination information, the value of the metadata allocated to the object.

Each of the application servers 2 transmits, in response to a request from the user of the terminal apparatus, according to a search condition designated by the user inputting a value of metadata, a search request for checking a storage destination of an object that satisfies the search condition. The network input and output unit 31 receives the search request transmitted to the own storage/index management server 3 and passes the received search request to the searching unit 35. The searching unit 35 extracts the value of the metadata stored in the passed search request, performs a search for an index, and causes the network input and output unit 31 to transmit a result of the search.

The storing unit 37 is used for storage of statistical information 37a. The statistical information 37a is information representing, for each combination of types of metadata (hereinafter referred to as "metadata names"), the number of times searches are performed under search conditions in which values are designated by the combination.

FIG. 2 is a diagram for explaining a configuration example of statistical information. "Metadata 1" and "metadata 2" shown in FIG. 2 represent different metadata names. Numerical value "1" and "2" added to the "metadata" represent order of registration in a dictionary or numbers allocated for identification. It is assumed that the numerical values represent the order of registration in the dictionary.

In FIG. 2, a configuration example of the statistical information is represented in a table format. Each of fields represents one kind of metadata name or two kinds of metadata names, the number of times of which is counted.

For example, in a field in which both of a row and a column are "metadata 1", the number of times searches are performed under a search condition in which only a value of the metadata 1 is designated as a metadata name. For example, "unused" described in a field in which the row is the "metadata 2" and the column is the "metadata 1" represents that the number of times is not stored. This is because, in searches under a search condition in which each value is designated by a combination of two kinds of metadata names, the combination of the two kinds of metadata names is specified in the order registered in the dictionary and the number of times is counted only in the specified combination.

FIGS. 3A to 3C are diagrams for explaining update examples of the statistical information. The examples shown in FIGS. 3A to 3C are examples in which "name" is assumed as the metadata 1 and "age" is assumed as the metadata 2. FIG. 3B shows a state after a search is performed once from the statistical information 37a in a state of FIG. 3A. FIG. 3C shows a state after a search is performed once from the statistical information 37a in the state of FIG. 3B.

The state shown in FIG. 3A is a state in which the statistical information 37a is cleared and is a state after a search is performed under a search condition in which values of two kinds of metadata names such as "name=Tanaka AND age=20" are designated. In the search condition, "name" and "age" are designated as one kind of metadata name and a combination of two kinds of metadata names is "name" and "age". Therefore, the number of times in a field in which both of the row and the column are "name", a field in which both of the row and the column are "age", and a field in which the row is "name" and the column is "age" are respectively updated from 0 to 1.

The state shown in FIG. 3B is a state after a search under a search condition in which a value of one kind of metadata name such as "name=Yamada" is designated when the statistical information 37a is in the state shown in FIG. 3A. In the search condition, the number of times in the field in which both of the row and the column are "name" is updated from 1 to 2.

The state shown in FIG. 3C is a state after a search is performed under a search condition in which values of two kinds of metadata names such as "name=Ueda AND age<30" are designated when the statistical information 37a is in the state shown in FIG. 3B. According to the search condition, the number of times is updated from 2 to 3 in the field in which both the row and the column are "name". The number of times is updated from 1 to 2 in the field in which both the row and the column are "age". The number of times is updated from 1 to 2 in the field in which the row is "name" and the column is "age".

In this embodiment, as explained above, the numbers of times are counted in both of the search in which only the value (metadata) of the one kind of metadata name is designated as the search condition and the search in which the values are designated as the search condition in the combinations of the two kinds of metadata names. Results of the counting are stored as the statistical information 37a. A combination of three or more kinds of metadata names is decomposed into combinations of two kinds of metadata names. The number of times is counted for each of the decomposed combinations. The statistical information 37a is used for determination of indexes of metadata names that each of the storage/index management servers 3 should be caused to manage.

If the same storage/index management server 3 manages indexes of two kinds of metadata names, values of which are designated by a search condition (an AND search), the storage/index management server 3 can extract all storage destination information of objects that satisfy the search condition. Therefore, the application server 2, to which a search request in which the search condition of the AND search is stored is transmitted, can acquire, according to a response from the storage/index management server 3 that transmits the search request, all the objects that satisfy the search condition.

All the objects that satisfy the search condition can be acquired according to the response from one storage/index management server 3. This means that it is possible to reduce the number of objects transmitted and received via the network 1. The one storage/index management server 3 can create a response, which should be transmitted, without performing communication with the other storage/index management servers 3. Therefore, during the AND search, if the same storage/index management server 3 manages indexes of a plurality of metadata name, values of which are designated by a search condition, it is possible to minimize a delay due to data transmission and reception.

The response is created by processing in the storage/index management server 3. Therefore, it is possible to more effectively utilize calculation resources of the storage/index management server 3. This means that it is possible to further suppress a load of the application server 2, which is the front end. According to the suppression of the load, the application server 2 can more quickly present objects, which are a search result, to the user of the terminal apparatus. Therefore, if the same storage/index management server 3 is caused to manage the indexes of the plurality of metadata names, the values of which are designated by the search condition, the number of searches executable per unit time increases and the search performance is practically improved.

It is effective in improving the search performance to cause the same storage/index management server 3 to manage the indexes of the plurality of metadata names, the values of which are designated by the search condition during the AND search. Therefore, the statistical information 37a is used for specifying a combination of metadata names, indexes of which the same storage/index management server 3 should be cause to manage.

In this embodiment, as shown in FIG. 2, the number of metadata names to be combined is two. This is because, as the number of metadata names to be combined increases, the number of the storage/index management servers 3, which are caused to manage indexes of the same metadata names, also increases and the number of indexes, which each of the storage/index management servers 3 are caused to manage, also increases. In other words, this is because the influence of an increase in a transfer amount of data via the network 1, an increase in a waste of calculation resources in the storage/index management server 3, and the like tends to increase. Therefore, in this embodiment, attention is paid to only a combination of two kinds of metadata names.

The searching unit 35 passes the search request passed from the network input and output unit 31 to the statistical information acquiring unit 36. The statistical information acquiring unit 36 extracts a search condition from the passed search request and increments the number of times corresponding to the extracted search condition to thereby update the statistical information 37a, that is, generates new statistical information 37a.

The index management server determining unit 38 determines, referring to the statistical information 37a, for each combination of two kinds of metadata names, the storage/index management server 3 that should be caused to manage indexes of the two kinds of metadata names. The index management server determining unit 38 performs, according to a result of the determination, control for changing the storage/index management server 3 caused to manage the indexes.

The management apparatus according to this embodiment is an apparatus that performs control for dynamically changing indexes that each of the storage/index management servers 3 is caused to manage. The management apparatus is realized by the index management server determining unit 38. That is, the management apparatus according to this embodiment is realized in a form in which the management apparatus is mounted on each of the storage/index management servers 3.

Note that the management apparatus may be mounted on each of the application servers 2. Another information processing apparatus (computer) connected to the network 1 may be used as the management apparatus. The other information processing apparatus may be one processing apparatus or may be two or more processing apparatuses.

FIG. 4 is a diagram for explaining a change example of the storage server and index management server caused to manage indexes.

In FIG. 4, for convenience, a system configuration is assumed in which only three storage/index management servers 3 (3-1 to 3-3) are connected to the network 1. A system configuration shown in an upper part of FIG. 4 is a state before the storage/index management server 3 caused to manage indexes is changed. A system configuration shown in a lower part of FIG. 4 is a state after the storage/index management server 3 caused to manage indexes is changed. In the system configurations, only objects A to C are shown as stored objects. As indexes, only two indexes, metadata names of which are "name" and "age", are shown.

In the system configuration shown in the upper part of FIG. 4, the three objects A to C are respectively stored in the storage/index management servers 3-1 to 3-3. The index, the metadata name of which is "name", is managed by the storage/index management server 3-1. The index, the metadata name of which is "age", is managed by the storage/index management server 3-3. Both the indexes are used for searches for storage destinations of the objects A to C. "Tanaka: object A" and the like shown as content examples of the index, the metadata name of which is "name", and "20: object A" and the like shown as content examples in the index, the metadata name of which is "age", indicate to that effect.

In the system configuration shown in the lower part of FIG. 4, the two indexes, the metadata names of which are "name" and "age", are managed by the storage/index management server 3-2. Therefore, in both of the storage/index management servers 3-1 and 3-3, indexes are absent.

"Name" and "age" are metadata names, values of which are simultaneously designated by a search condition. In this embodiment, if a set change condition is satisfied, the same storage/index management server 3 is caused to manage indexes of two kinds of metadata names, value of which are simultaneously designated by a search condition. By providing the change condition, in this embodiment, a change of the storage/index management server 3 caused to manage indexes is limited.

In this embodiment, the change condition is set focusing on a frequency at which the values of the two kinds of metadata names are simultaneously designated by the search condition. More specifically, as the change condition, a co-occurrence rate r exceeding a threshold α is obtained.

The co-occurrence rate r means a rate at which the values of the two kinds of metadata names are simultaneously designated by the search condition. When the numbers of times one of the values of the two kinds of metadata names and the other are respectively designated by the search condition are represented as $c_A$ and $c_B$ and the number of times the values of the two kinds of metadata names are simultaneously designated by the search condition is represented as $c_{AB}$, the co-occurrence rate r is calculated using, for example, the following expression:

$$r = c_{AB}/(c_A + c_B - c_{AB}) \quad (1)$$

The co-occurrence rate r may be calculated using the following expression:

$$r = c_{AB}/C \quad (2)$$

In the expression, C is a total number of times searches are performed.

The low co-occurrence rate r means that, even if the same storage/index management server 3 is caused to manage indexes of two kinds of metadata names, a frequency at which searches for the two indexes are simultaneously performed is small. If the searches for the two indexes are not simultaneously performed, by causing the different storage/index management servers 3 to respectively manage the indexes, it is possible to more effectively use calculation resources of the two storage/index management servers 3. Therefore, in this embodiment, the threshold α is set and the same storage/index management server 3 to manage the indexes of the two kinds of metadata names that satisfy the change condition (a relation of r>α). As the threshold α, it is conceivable to set, for example, a value near 0.5.

The index management server determining unit 38 calculates, referring to the statistical information 37a, the co-occurrence rate r for each combination of two kinds of metadata names. The index management server determining unit 38 determines, for each combination of two kinds of metadata names, from the calculated co-occurrence rate r, whether the index management server determining unit 38 should cause the same storage/index management server 3 to manage indexes of the two kinds of metadata names. According to the determination, the index management server determining unit 38 causes the same storage/index management server 3 to manage indexes of two kinds of metadata names, the calculated co-occurrence rate r of which exceeds the threshold α.

The combination of the two kinds of metadata names for which the index management server determining unit 38 calculates the co-occurrence rate r is a combination serving as a management unit supported by the statistical information 37a. Metadata names for which the number of times can be counted using the statistical information 37a are limited to metadata names, values of which are designated by a search condition in a search request transmitted to the own storage/index management server 3.

In this embodiment, according to a determination result of the index management server determining unit 38 of any one of the storage/index management servers 3, the storage/index management server 3 caused to manage target indexes is immediately changed. If the storage-index management server 3 caused to manage indexes is changed, it is likely that an appropriate response to a search request cannot be performed until the change ends. Therefore, in this embodiment, the index management server determining unit 38 stops a search service while the index management server determining unit 38 is operated to start according to an instruction from the outside.

A result of a combination of two kinds of metadata names, indexes of which the same storage/index management server 3 is determined to be caused to mange by the same storage/index management server 3, (hereinafter referred to as "index management information") is shared by the storage/index management servers 3. Therefore, the change of the storage/index management server 3 caused to manage indexes is performed only for a combination not registered in index management information.

FIG. 12 is a diagram showing a configuration example of an information processing apparatus usable as the storage server and index management server according to this embodiment. An example of the information processing apparatus usable as the storage/index management server 3 according to this embodiment is specifically explained with reference to FIG. 12.

The information processing apparatus includes, as shown in FIG. 12, a CPU (Central Processing Unit) 51, an FWH (Firm-Ware Hub) 52, a memory (a memory module) 53, an NIC (Network Interface Card) 54, a hard disk device (HD) 55, a fan 56, a controller 57, and a BMC (Baseboard Management Controller) 58. This configuration is an example. The configuration of the information processing apparatus usable as the storage/index management server 3 is not limited to the configuration shown in FIG. 12.

The FWH 52 is a memory in which firmware is stored. The firmware is read out to the memory 53 and executed by the CPU 51. An OS (Operating System) and various application programs (hereinafter abbreviated as "applications") are stored in the hard disk device 55. The application includes an application to be caused to function as nodes (the storage/index management servers 3) that configure the distributed object storage (hereinafter referred to as "distributed object storage system"). After the start of the firmware is completed, the CPU 51 can read out the OS and the distributed object storage system from the hard disk device 55 via the controller 57 and execute the OS and the distributed object storage system. Communication via the NIC 54 is enabled by the start of the OS.

The distributed object storage system may be stored in a storage or a recording medium other than the hard disk device 55. The storage or the recording medium may be accessible by an external apparatus with which the NIC 54 can communicate via a network. Therefore, the distributed object storage system may be received from the external apparatus.

The BMC 58 is a dedicated management device for managing the information processing apparatus. The BMC 58 performs ON/OFF of the CPU 51, monitoring of errors that occur in the components, and the like. The controller 57 is an interface to which the disk device 4 shown in FIG. 1 can be connected.

In the information processing apparatus having the configuration explained above, the network input and output unit 31 is the NIC 54. The disk input and output unit 34 is the controller 57. The storing unit 37 is realized by, for example, the memory 53, the hard disk device 55, and the controller 57. All of the data reading and writing unit 32, the metadata reading and writing unit 33, the searching unit 35, the statistical information acquiring unit 36, and the index management server determining unit 38 are functions realized by the CPU 51 executing the distributed object system on the OS. Therefore, all of the data reading and writing unit 32, the metadata reading and writing unit 33, the searching unit 35, the statistical information acquiring unit 36, and the index management server determining unit 38 are realized by the CPU 51, the FWH 52, the memory 53, the hard disk device 55, and the controller 57.

The distributed object storage system causes the CPU 51 to execute various kinds of processing. The operation of the CPU 51 by the execution of the distributed object storage system is explained in detail below with reference to various flowcharts shown in FIGS. 5 to 10.

Figure 5:
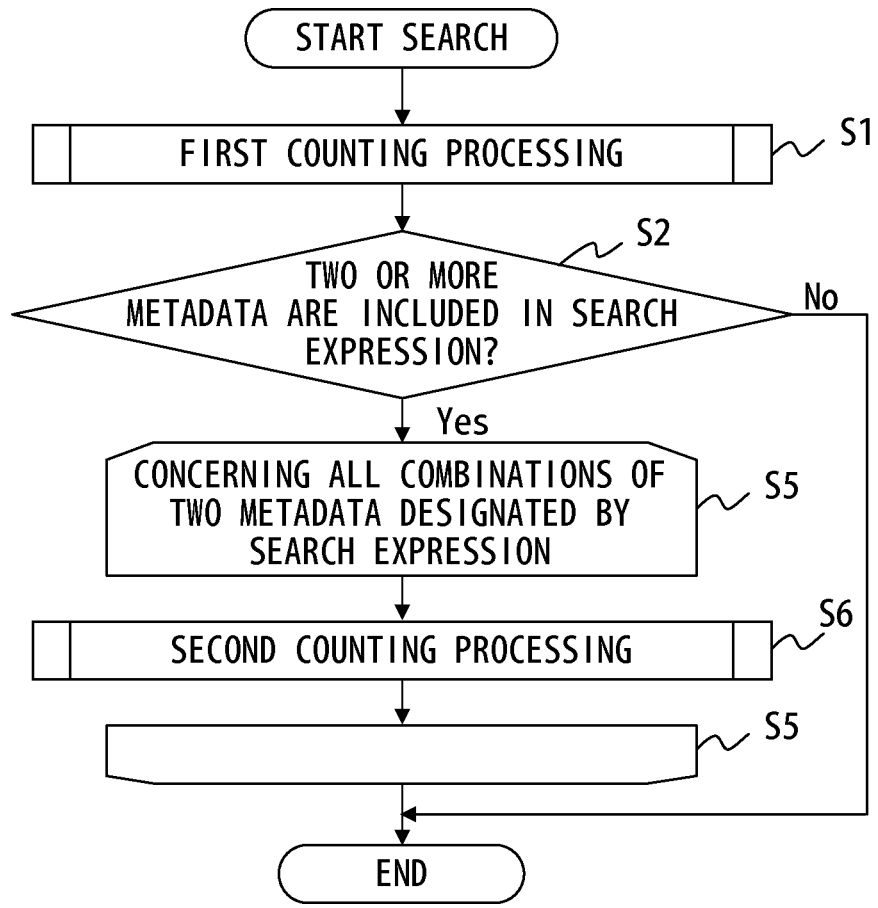
FIG. 5 is a flowchart of statistical information update processing.

FIG. 5 is a flowchart of statistical information update processing. The statistical information update processing is processing executed when the NIC 54 receives, from any one of the application servers 2, a search request for requesting searches. The statistical information update processing realizes a part of the function of the statistical information acquiring unit 36. The update information 37a is updated by the execution of the statistical information update processing according to a metadata name, a value of which is designated by a search condition in the received search request. To begin with, the statistical information update processing is explained in detail with reference to FIG. 5.

First, the CPU 51 executes, for each metadata name, a value of which is designated by the search condition in the search request, first counting processing for updating the number of times of searches for the metadata name (S1). After executing the first counting processing, the CPU 51 determines whether values (metadata) of two or more kinds of metadata names are included in the search condition (referred to as "search expression" in FIG. 5) (S2). If metadata names, values of which are designated by the search condition, are two or more kinds of metadata name, it is determined yes in S2 and the processing shifts to S5. If the metadata names, values of which are designated by the search condition, are one kind of metadata name, it is determined no in S2. The statistical information update processing ends.

S5 is a processing loop. In the processing loop S5, the CPU 51 executes, for each combination of two kinds of metadata names, values of which are designated by the search condition in the search request, second counting processing for updating the number of times of searches for the metadata name (S6). If the number of times is updated in all combinations of the two kinds of metadata names, the processing loop S5 ends. The statistical information update processing also ends.

FIG. 6 is a flowchart of the first counting processing. FIG. 7 is a flowchart of the second counting processing. Respective kinds of subroutine processing executed as S1 and S6 in the statistical information update processing are explained in detail with reference to FIGS. 6 and 7.

In the first counting processing executed as S1, as shown in FIG. 6, for each metadata name, a value of which is designated by the search condition in the search request, a processing loop S10 for updating the number of times of searches for the metadata name is executed. In the processing loop S10, first, the CPU 51 acquires a metadata name, value of which is designated by the search condition (S11). Subsequently, the CPU 51 extracts the number of times corresponding to the acquired metadata name from the statistical information 37a (S12). In FIG. 6, the statistical information 37a is represented as "table" and the number of times is represented as "matrix".

After the number of times is extracted, the CPU 51 increments the number of times (S13). According to the increment of the number of times, a series of processing for one metadata name ends. If all metadata names, values of which are designated by the search condition, are set as targets, after the series of processing ends, the processing loop S10 ends and the first counting processing ends.

In the second counting processing executed as S6, as shown in FIG. 7, first, the CPU 51 acquires two kinds of metadata names, values of which are designated by the search condition (S21). Subsequently, the CPU 51 compares the acquired two kinds of metadata names in dictionary order and sets the metadata name in smaller dictionary order, that is, appearing earlier as a first metadata name and sets the remainder as a second metadata name (S22).

Subsequently, the CPU 51 extracts, out of the statistical information 37a, the number of times corresponding to a combination of the first and second metadata names (S23). The number of times is the number of times stored in the field in which the first metadata name is the row and the second metadata name is the column in FIG. 2. After the number of times is extracted, the CPU 51 increments the number of times (S24). After the number of times is incremented, the second counting processing ends.

The first counting processing and the second counting processing are executed in the statistical information update processing, whereby, every time the search request is received, the statistical information 37a is updated as indicated by an example shown in FIG. 3.

Note that, in this embodiment, the extraction of the number of times corresponding to the combination of the two kinds of metadata names out of the statistical information 37a is specified by a set of order of appearance of the metadata names in the dictionary. However, the extraction of the number of times may be allowed to be performed by other methods. Specifically, for example, the statistical information 37a may be an aggregate of sets including hash values and the numbers of times. If the statistical information 37a is the aggregate of the sets including the hash values and the numbers of times, the second counting processing may be contents indicated by the flowchart in FIG. 8.

Figure 8:
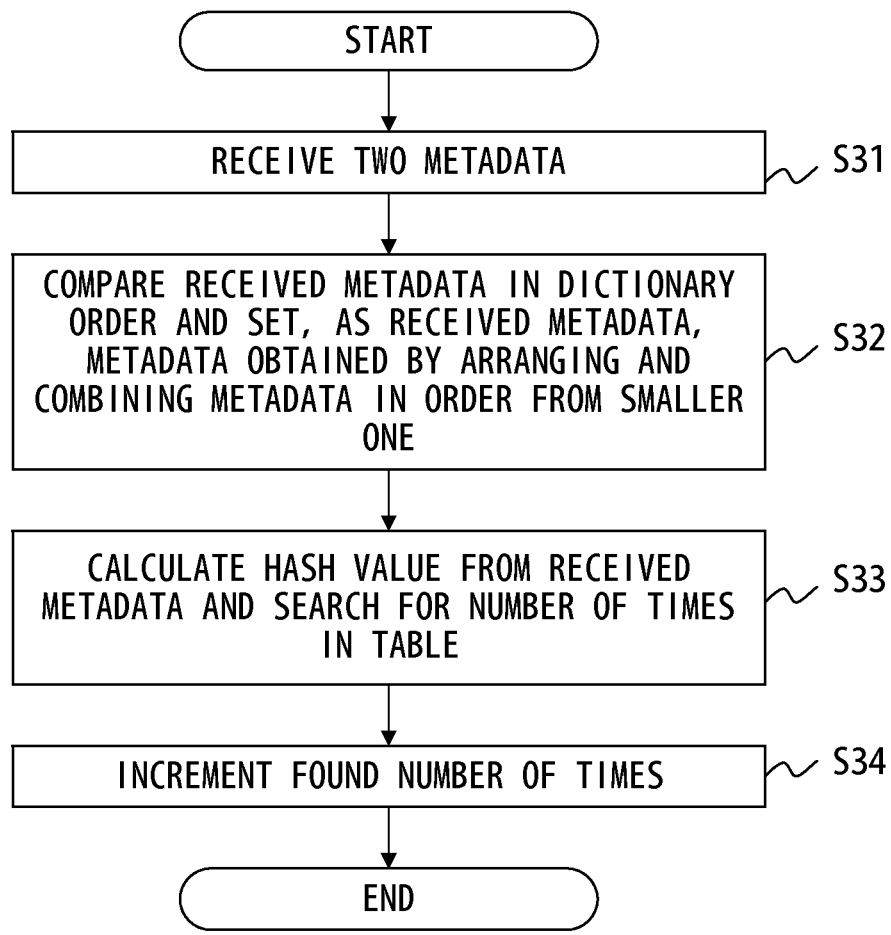
FIG. 8 is a flowchart of a modification of the second counting processing.

In the second counting processing, the flowchart of which is shown in FIG. 8, first, the CPU 51 acquires two kinds of metadata names, values of which are designated by a search condition (S31). Subsequently, the CPU 51 compares the acquire two kinds of metadata data name in dictionary order, sets the metadata name in smaller dictionary order as a first metadata name and sets the remainder as a second metadata name, and sets, as a final metadata name, a metadata name obtained by arranging and combining the first metadata name and the second metadata name in this order (S32).

Subsequently, the CPU 51 calculates a hash value using the final metadata name and extracts, by searching through the statistical information 37a using the calculated hash value, the number of times corresponding to the search (S33). After extracting the number of times, the CPU 51 increments the number of times (S34). After the number of times is incremented, the second counting processing in the modification ends.

Figure 9:
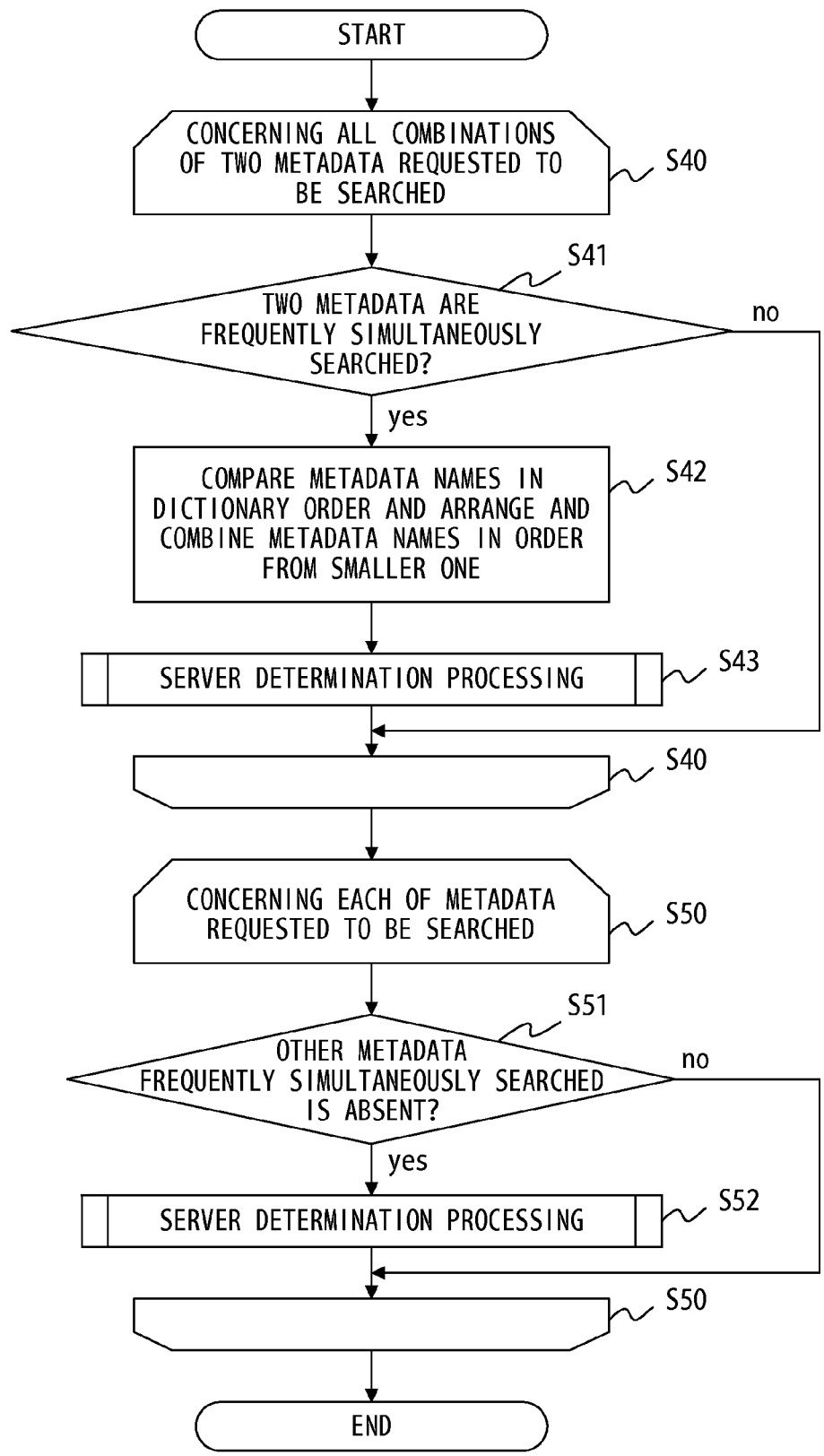
FIG. 9 is a flowchart of index management server determination processing.

FIG. 9 is a flowchart of index management server determination processing. In the index management server determination processing, two kinds of metadata names, indexes of which the same storage/index management server 3 should be caused to manage, are specified. In the index management server determination processing, processing for causing the storage/index management server 3, which should be caused to manage the indexes of the specified two kinds of metadata names, to store the indexes is performed. The index management server determining unit 38 is realized by the CPU 51 executing the index management server determination processing. The index management server determination processing is executed according to reception of a request for requesting management of the indexes from the outside, for example, any one of the application servers 2. The request is transmitted according to, for example, instruction or setting by an administrator who manages the information processing system.

In the index management server determination processing, two processing loops S40 and S50 are executed in this order. The processing loop S40 is a processing loop for causing, for each combination of two kinds of metadata names, the storage/index management server 3, which should be caused to manage the two indexes, to manage the indexes. The processing loop 50 is processing loop for causing, for each one kind of metadata name, the storage/ index management server 3, which should be caused to manage an index of the one kind of metadata, to manage the index.

Each of the storage/index management server 3 can count the number of times for the one kind of metadata name and the combination of the two kinds of metadata names, values of which are designated by the search condition in the search request received by the storage/index management server 3. Each of the application servers 2 usually specifies, from a metadata name, a value of which is designated by the user of the terminal apparatus, the storage/index management server 3 to which the search request should be transmitted and transmits the search request to the specified storage/ index management server 3. Therefore, in this embodiment, the metadata name and the combination of the two kinds of metadata names, which each of the storage/index management servers 3 is caused to set as targets, are metadata names designated by the search condition in the past, that is, metadata names, the number of times of searches for which is equal to or larger than 1.

In the loop S40, first, the CPU 51 extracts, referring to the statistical information 37a, one of combinations of two kinds of metadata name, the number of times of searches for which is equal to or larger than one, calculates the co-occurrence rate r of the extracted combination, and determines whether the calculated co-occurrence rate r is larger than the threshold α (S41). If a search simultaneously designating the combination is frequently requested, it is determined yes in S41 and the processing shifts to S42. If the search simultaneously designating the combination is not frequently requested, it is determined no in S41. A series of processing in the processing loop S40 ends. As a result, in the processing loop S40, it is determined whether a combination not extracted among the combinations of two kinds of metadata name, the number of times of searches for which is equal to or larger than one, is present. If a combination to be extracted is absent, the processing loop S40 ends. If a combination to be extracted remains, S41 is executed again.

In the determination processing in S41, actually, the index management information is used. In the index management information, for example, a combination of the two kinds of metadata names for which it is determined yes in S41 for the first time is registered. Consequently, for a combination already registered in the index management information, it is determined no in S41 irrespective of a value of the co-occurrence rate r.

In S42, the CPU 51 compares the extracted two kinds of metadata names in dictionary order, sets the metadata name in smaller dictionary order as a first metadata name and sets the remainder as a second metadata name, and arranges and combines the first metadata name and the second metadata name in this order. Subsequently, the CPU 51 executes server determination processing for determining the storage/ index management server 3 caused to manage indexes of the two kinds of metadata names and causing the determined storage/index management server 3 to move the two indexes (S43). After the server determination processing is executed, the series of processing in the processing loop S40 ends. The metadata name combined in S42 is used for the determination of the storage/index management server 3 caused to manage the two indexes.

Figure 10:
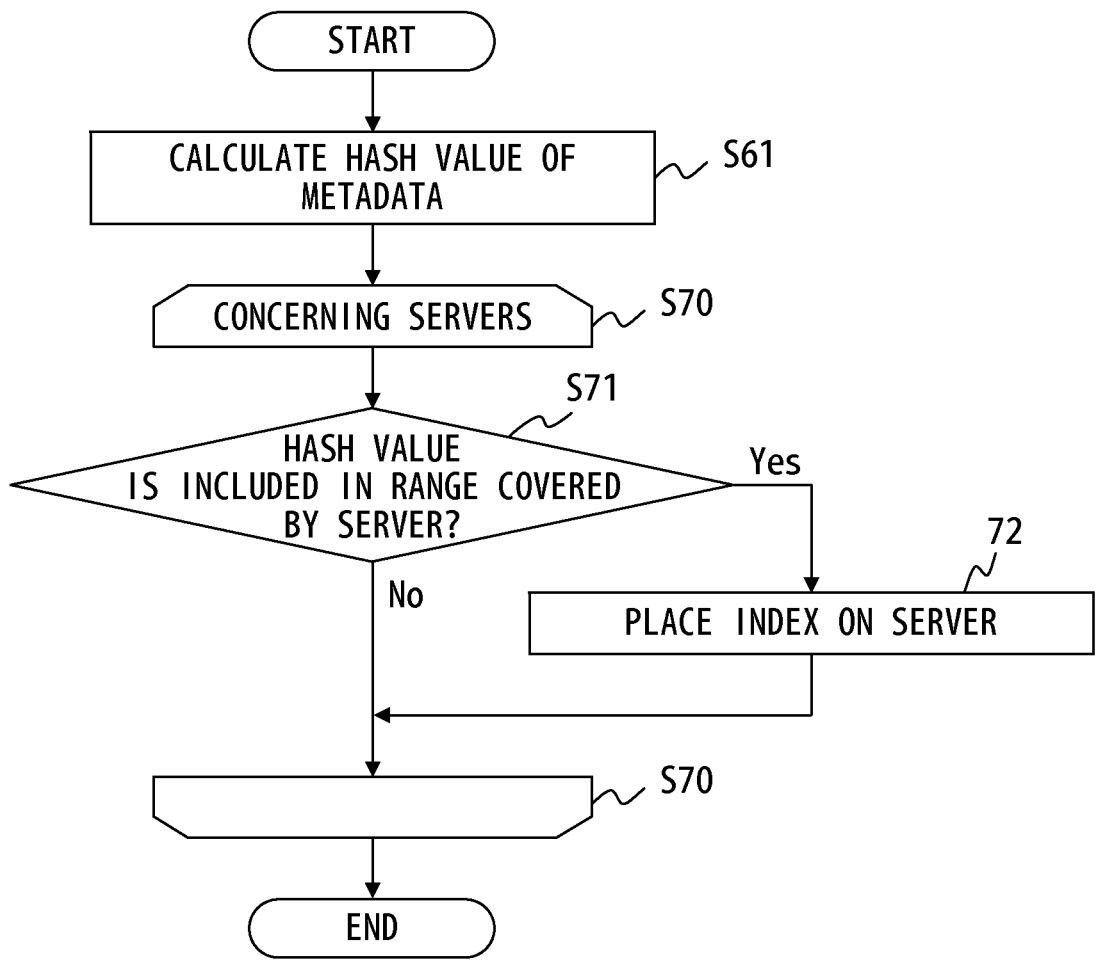
FIG. 10 is a flowchart of server determination processing.

FIG. 10 is a flowchart of the server determination processing. The server determination processing executed in S43 and S51 explained below are explained in detail with reference to FIG. 10. The index management server determination processing passes a metadata name to the server determination processing as an argument. For the determination of the storage/index management server 3 caused to manage indexes, a server list table shown in FIG. 11 is used.

The server list table is, for example, shared information retained by the application servers 2 and the storage/index management servers 3. As shown in FIG. 11, in the server list table, for each storage/index management server 3, a range of a hash value allocated to the storage/index management server 3 is defined. Consequently, the metadata name passed from the index management server determination processing is used for calculation of a hash value.

First, the CPU 51 calculates a hash value using the metadata name passed from the index management server determination processing (S61). Subsequently, the CPU 51 determines, using the calculated hash value, the storage/index management server 3 caused to manage indexes and executes a processing loop S70 for moving indexes to the determined storage/index management server 3.

In the processing loop S70, first, the CPU 51 selects one storage/index management server 3 set as a target in the server list table and determines whether the calculated hash value is within a range of a hash value allocated to the selected storage/index management server 3 (S71). If the calculated hash value is within the range, it is determined yes in S71 and the processing shifts to S72. If the calculated hash value is outside the range, it is determined no in S71. A series of processing in the processing loop S70 ends. In this case, if the storage/index management server 3 to be selected is absent, the processing loop S70 ends. Thereafter, the server determination processing ends.

In S72, the CPU 51 performs processing for moving an index specified from the passed metadata name to the currently-selected storage/index management server 3. After the execution of the processing, the series of processing in the processing loop S70 ends.

The metadata name passed from the index management server determination processing is one kind of metadata name or a combination of two kinds of metadata names. Therefore, the index to be moved can be specified from the passed metadata name.

The storage/index management server 3 that manages the index to be moved is specified from the server list table. The storage/index management server 3 is the storage/index management server 3 in which a hash value calculated using the metadata name of the index to be moved is within the range of the allocated hash value. Therefore, if the storage/index management server 3 that manages the index to be moved (hereinafter referred to as "moving source server 3") is different from the storage/index management server 3 in which the calculated hash value is within the range (hereinafter referred to as "moving destination server 3"), the CPU 51 has to move the index. Therefore, for example, the CPU 51 transmits the moving destination server 3, the metadata name of the index to be moved, and the like to the moving source server 3 and instructs the moving source server 3 to move the index to be moved to the moving destination server 3. In this way, the CPU 51 causes the moving destination server 3 to store the index transmitted from the moving source server 3.

In the moving destination server 3, because indexes increase, it is likely that a search request not transmitted thereto in the past is transmitted from the application server 2. Therefore, in the moving destination server 2, the statistical information 37*a* is cleared.

The index management server determination processing in FIG. 9 is explained again.

According to the end of the processing loop S40, the processing loop S50 is executed. According to the execution of the processing loop S40, the indexes of the two kinds of metadata names, which the same storage/index management server 3 should be caused to manage, is managed by the storage/index management server 3 that should be caused to manage the indexes of the two kinds of metadata names. Therefore, a metadata name, an index of which is likely to be moved in the processing loop S50, is only a metadata name not registered in the index management information.

In the processing loop S50, first, the CPU 51 extracts, referring to the statistical information 37*a*, one kind of metadata name, the number of times of searches for which is equal to or larger than 1, and determines whether the extracted metadata name is not registered in the index management information (S51). If the extracted metadata name is not registered in the index management information, it is determined yes in S51 and the processing shifts to server determination processing in S52. In this case, the extracted metadata name is passed to the server determination processing as an argument. If the extracted metadata name is registered in the index management information, it is determined no in S51. A series of processing in the processing loop S50 ends.

When the series of processing ends, if a metadata name to be extracted is absent, the processing loop S50 ends. After the processing loop S50 ends, the index management server determination processing ends.

After any one of the storage/index management servers 3 is caused to store the index of the one kind of metadata name, it is unnecessary to move the index unless there is a special reason such as update of the server list table. Therefore, usually, the processing loop S50 is not executed. However, to clarify the storage/index management server 3 in which the index of the one kind of metadata name is stored first, the processing loop S50 is shown in the flowchart together with the processing loop S40. The application servers 2 can specify, referring to the server list table shown in FIG. 11 and the index management information, the storage/index management server 3 to which the search request should be transmitted.

Note that, in this embodiment, the co-occurrence rate r is used to determine whether the same storage/index management server 3 is caused to manage the indexes of the two kinds of metadata names. Another indicator may be used for the determination. Alternatively, the co-occurrence rate r may be combined with another indicator. For example, if a pattern is observed between the weight of a load of the entire storage/index management server 3 and two or more kinds of metadata names simultaneously designated during searches, the pattern may be reflected on management of indexes. As the indicator used instead of the co-occurrence rate r, for example, the number of searches per unit time is conceivable. As the indicator used instead of the co-occurrence rate r or/and another indicator that can be combined with the co-occurrence rate r, a data amount of objects or indexes, an average processing time required for one search, the weight of an average load of one search, and the like are conceivable.

The co-occurrence rate r tends to greatly change in a situation in which the number of samples is small. It is likely that, in a situation in which the number of samples is small, the co-occurrence rate r is larger than the threshold α, and the same storage/index management server 3 is caused to manage two indexes that are actually unnecessary. Therefore, a condition for limiting a target for which the co-occurrence rate r is calculated may be provided. Alternatively, among the combinations of the two kinds of metadata names registered in the index management information, a combination that another storage/index management server 3 should be caused to manage may be specified to perform the movement of indexes. It is conceivable to set another threshold β smaller than the threshold α and specify, on condition that a relation r<β is satisfied, a combination for which indexes are moved.

In this embodiment, each of the storage/index management servers 3 is configured to be capable of performing generation or update of the statistical information 37a and determination of the storage/index management server 3 caused to manage indexes. Separate apparatuses may be caused to respectively perform the generation or update of the statistical information 37a and the determination of the storage/index management server 3 caused to manage indexes. Therefore, the management apparatus may be realized using a plurality of information processing apparatuses (computers).

The storage/index management server 3 to which indexes are moved may be determined focusing on the weight of a load of each of the storage/index management servers 3. It is also possible that priority order of the storage/index management server 3 to which indexes are moved is set and the storage/index management server 3 to which indexes are moved is determined according to the set priority order.

Besides the above, various modifications are possible.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
a plurality of second information processing apparatuses connected to a first information processing apparatus via a network; and
a management apparatus, wherein
the plurality of second information processing apparatuses dispersedly manage indexes established for searches using data and metadata of the data, and
the management apparatus includes a processor configured to monitor a search request transmitted from the first information processing apparatus, and to specify a combination of types of the metadata, for which the processor should cause a same second information processing apparatus to manage the indexes, on the basis of a co-occurrence rate of the combination of types of the metadata for a search condition contained in the search request, and to specify the same second information processing apparatus on the basis of the specified combination of types of the metadata, and to cause the specified same second information processing apparatus to manage the indexes of the type of the metadata of the specified combination, and to cause a storage connected to the specified same second information processing apparatus to store the indexes of the type of the metadata of the specified combination.

2. The information processing system according to claim 1, wherein
the processor generates, for each combination of types of metadata designated by the search request monitored by the processor, statistical information representing a result in which the metadata is simultaneously designated in the combination, and specifies, on the basis of the statistical information, a combination of types of the metadata, the indexes of which the same second information processing apparatus should be caused to manage.

3. The information processing system according to claim 2, wherein
the processor counts, for each combination of two kinds of metadata, a number of times the two kinds of metadata are simultaneously designated and generates or updates the statistical information, and performs, with indexes of the two kinds of metadata set as a management unit, determination concerning whether the same second information processing apparatus should be caused to manage the indexes.

4. A management apparatus comprising:
a processor configured to
monitor a search request transmitted from, via a network, a first information processing apparatus to a plurality of second information processing apparatuses connected to the first information processing apparatus, the plurality of second information processing apparatuses dispersedly manage indexes established for searches using data and metadata of the data,
specify a combination of types of the metadata, for which the index managing unit should cause a same second information processing apparatus to manage the indexes, on the basis of a co-occurrence rate of the combination of types of the metadata for a search condition contained in the search request,
specify the same second information processing apparatus on the basis of the specified combination of types of the metadata,
cause the specified same second information processing apparatus to manage the indexes of the type of the metadata of the specified combination, and
cause a storage connected to the specified same second information processing apparatus to store the indexes of the type of the metadata of the specified combination.

5. A non-transitory computer-readable recording medium having stored therein a management program for causing a computer connected to a network to execute a process, the process comprising:
monitoring a search request transmitted from, via the network, a first information processing apparatus to a plurality of second information processing apparatuses which dispersedly manage indexes established for searches using data and metadata of the data;
specifying a combination of types of the metadata, for which a same second information processing apparatus should be caused to manage the indexes, on the basis of a co-occurrence rate of the combination of types of the metadata for a search condition contained in the search request;
specifying the same second information processing apparatus on the basis of the specified combination of types of the metadata;
causing the specified same second information processing apparatus to manage the indexes of the type of the metadata of the specified combination; and
causing a storage connected to the specified same second information processing apparatus to store the indexes of the type of the metadata of the specified combination.

6. An index management method performed using a computer connected to a network, the index management method comprising:

monitoring, by a processor, a search request transmitted from, via the network, a first information processing apparatus to a plurality of second information processing apparatuses which dispersedly manage indexes established for searches using data and metadata of the data;

specifying a combination of types of the metadata, for which a same second information processing apparatus should be caused to manage the indexes, on the basis of a co-occurrence rate of the combination of types of the metadata for a search condition contained in the search request;

specifying the same second information processing apparatus on the basis of the specified combination of types of the metadata;

causing the specified same second information processing apparatus to manage the indexes of the type of the metadata of the specified combinations; and causing a storage connected to the specified same second information processing apparatus to store the indexes of the type of the metadata of the specified combination.

7. The information processing system according to claim 1, wherein the processor moves the indexes of the type of the metadata of the specified combination from a moving-source information processing apparatus from among the plurality of second information processing apparatuses to the specified same second information processing apparatus.

8. The management apparatus according to claim 4, wherein the processor moves the indexes of the type of the metadata of the specified combination from a moving-source information processing apparatus from among the plurality of second information processing apparatuses to the specified same second information processing apparatus.

9. The non-transitory computer-readable recording medium according to claim 5, further comprising:

moving the indexes of the type of the metadata of the specified combination from a moving-source information processing apparatus from among the plurality of second information processing apparatuses to the specified same second information processing apparatus.

10. The index management method according to claim 6, further comprising:

moving the indexes of the type of the metadata of the specified combination from a moving-source information processing apparatus from among the plurality of second information processing apparatuses to the specified same second information processing apparatus.

* * * * *